United States Patent [19]

Touchette et al.

[11] 3,989,564
[45] Nov. 2, 1976

[54] BUILDING A CLOSED TORUS TIRE

[75] Inventors: John W. Touchette, Hartville; Paul E. Appleby, Cuyahoga Falls, both of Ohio

[73] Assignee: The Goodyear Tire & Rubber Company, Akron, Ohio

[22] Filed: Aug. 4, 1975

[21] Appl. No.: 601,968

[52] U.S. Cl. ............................. 156/118; 156/124; 156/133; 156/397; 156/401; 156/414
[51] Int. Cl.² ........................................ B29H 17/10
[58] Field of Search ............... 156/110 R, 117, 118, 156/121, 123, 124, 133, 394 R, 397, 400, 401, 414–420; 152/354, 355, 361, 363; 864/313, 316, 317, DIG. 44; 425/DIG. 125

[56] References Cited
UNITED STATES PATENTS

| | | | |
|---|---|---|---|
| 2,915,102 | 12/1959 | Alexeff et al. | 156/117 |
| 2,943,668 | 7/1960 | Trevaskis et al. | 156/401 |
| 3,171,462 | 3/1965 | Reinhart | 152/355 |
| 3,223,566 | 12/1965 | Niclas et al. | 56/123 |
| 3,318,357 | 5/1967 | Schwall | 152/363 |
| 3,392,072 | 7/1968 | Alderfer | 156/123 |
| 3,458,146 | 7/1969 | Warner | 156/117 |
| 3,476,633 | 11/1969 | Henley | 156/415 |
| 3,606,921 | 9/1971 | Grawey | 152/354 |
| 3,692,605 | 9/1972 | Cantanutti | 156/401 |
| 3,864,188 | 2/1975 | Grawey et al. | 156/117 |

*Primary Examiner*—William A. Powell
*Assistant Examiner*—John E. Kittle
*Attorney, Agent, or Firm*—F. W. Brunner; R. S. Washburn

[57] ABSTRACT

Method and apparatus for use in building a closed torus tire. An expandable sleeve having an inflatable portion expands to wrap a sheet of tire building material partially about a disintegratable generally toroidal core. A bladder beneath the sleeve is then inflated to roll the sleeve toward the core causing the edges of the sheet to flip or snap from the sleeve surface to the core surface. The apparatus includes a drum expandable to either of two fully supported and different building diameters enabling stable support first of the core with at least one sheet of material engaged with the internal circumference of the core, and then the core with added thickness of tire components engaged with the internal diameter of the core.

17 Claims, 2 Drawing Figures

BUILDING A CLOSED TORUS TIRE

The foregoing abstract is not to be taken as limiting the invention of this application, and in order to understand the full nature and extent of the technical disclosure of this application, reference must be made to the accompanying drawing and the following detailed description.

The present invention relates to building tires, and particularly to what will be referred to herein as closed torus tires. For the purpose hereof, by a closed torus tire is meant a pneumatic tire having an inflation chamber which is, in all planes passing through and containing the axis of rotation of the tire, closed about its entire periphery by elastomeric material reinforced with cords or cables which also form the strength members of the tire. This is opposed to the more conventional tire wherein the inflation chamber is either, as in a tubeless tire, not fully enclosed by elastomeric material or, as in the case of a tube-type tire, the inflation chamber is not fully enclosed by elastomeric material reinforced with cord or cable which also forms the strength member of the tire carcass. A tire of this general type is shown, for example, in U.S. Pat. No. 3,606,921. It is known to construct a tire by winding the reinforcement or strength members around a generally toroidal disintegratable core. The core may be generally elliptical in cross-section and may be hollow. As disclosed in U.S. Pat. No. 3,171,462 or in 3,318,357, the core may be made of a material which is readily dissolved in water or some other solvent, or which can be treated in such a manner as to permit it to be readily removed through the tire air inlet. For example, the core may be made from a material such as plaster or paris, which can be readily dissolved in a mild acid such as acetic acid, and can thereby be easily washed out from within the carcass. It is obvious that the core material and the dissolving medium should be chosen from material which do not corrode, deteriorate, or otherwise have an adverse effect upon the various components of the tire. An alternate method of forming the mandrel is to cast or mold a toroidal form from a soluble material such as a cold hardening, soluble material designated as Rezolin, manufactured by the Rezolin Manufacturing Corporation. This material may be put into solution and flushed out of the tube after the tire has been formed. In a further alternate method, the rigid core can be provided in accordance with the procedure outlined in U.S. Pat. No. 3,606,921, previously mentioned, wherein in a split toroidal cavity mold having the desired cross-section of the same inside dimensions and configuration as to the tire to be constructed. The described mold cavity is then filled with a mixture of cork, sand, sodium silicate, and iron oxide in a manner in which this mixture can be tightly compressed within the mold cavity. Thereafter, $CO_2$ gas under pressure is passed through the mixture in the mold cavity which ultimately fuses the mixture into a rigid toroidal sand core with a selected cross-section. The sand core is carefully removed from the mold cavity and placed in an oven where it is baked for 24 hours at approximately 200° F. to improve its structural integrity.

The principal objects of the invention are to provide an improved apparatus and method for use in building a closed torus tire of the general type hereinabove described.

To acquaint persons skilled in the related arts with the principles of the invention, preferred embodiments illustrating the best modes now contemplated for the practice of the invention are, by way of illustration but not of limitation, described herein by and referring to the accompanying drawings, wherein.

Figure 1:
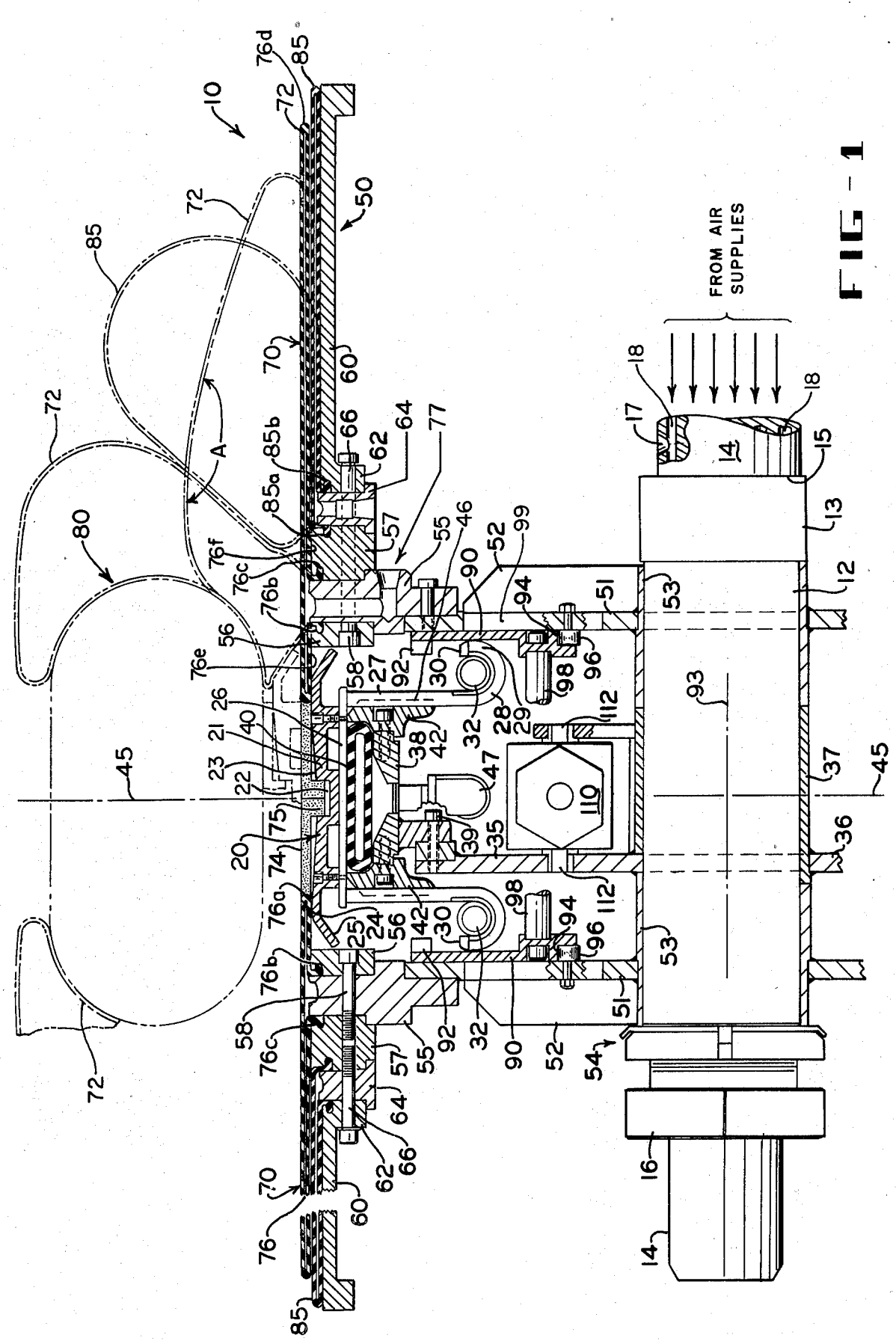
FIG. 1 is an axial cross-section view of a representative part of a tire building drum in accordance with the invention.
Figure 2:
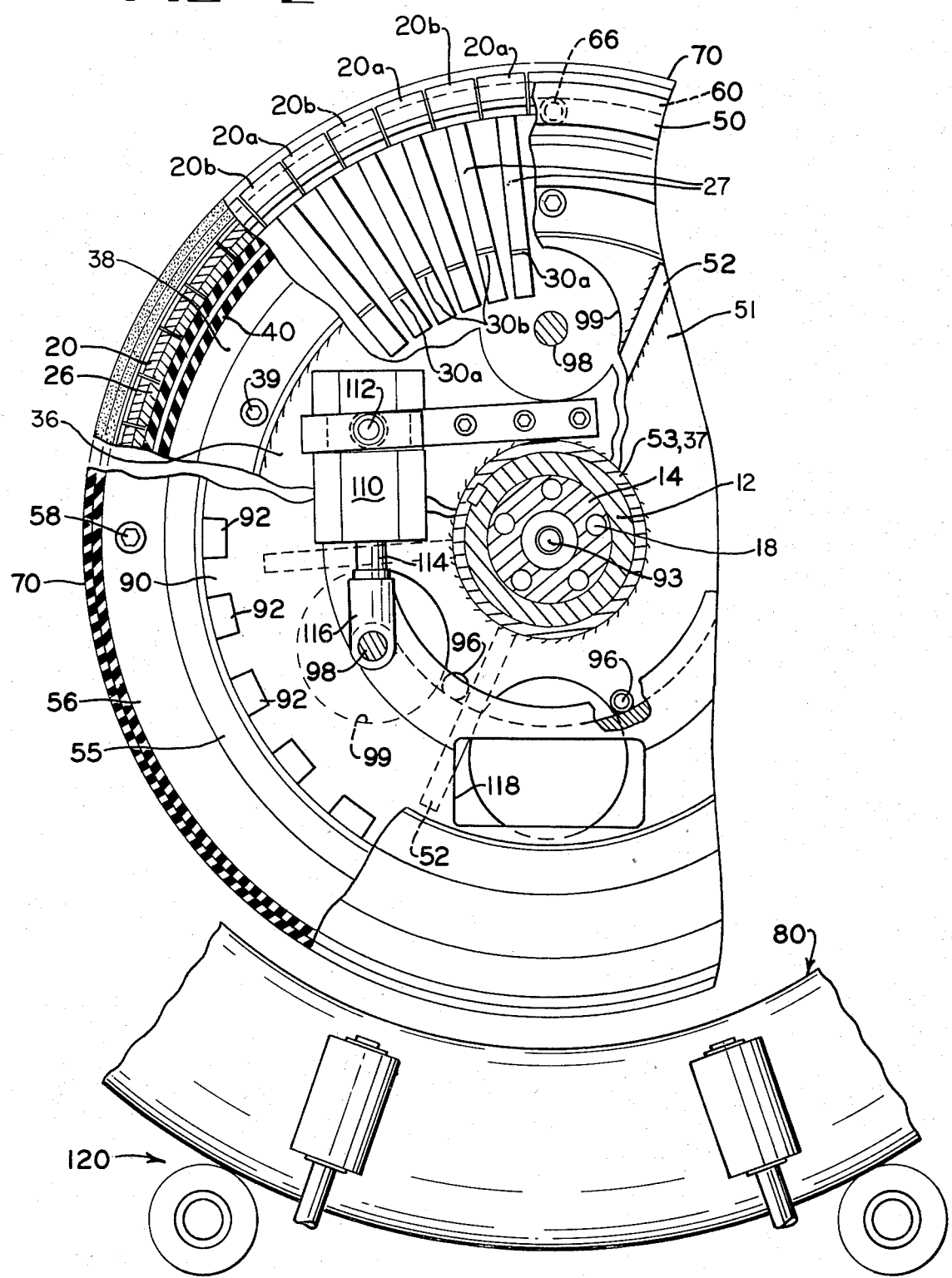
FIG. 2 is an axial end view of the tire building drum of FIG. 1 with parts broken away to expose interior features.

Referring to the drawings, FIGS. 1 and 2; the tire building drum 10, embodying the invention, is adapted for mounting rotatably on a tire building machine by a cylindrical center sleeve 12 having a hub 13 at one end and being threaded at its other end. The sleeve is bored for mounting coaxially on a building machine center shaft 14 having a shoulder 15 abutting the hub 13 and a split clamp collar 16 abutting the outboard end of the sleeve 12. Means such as the passages 17 and 18 for delivering compressed air for operation of the drum can be incorporated in the shaft 14.

The drum has an array of segments 20 forming its central portion, there being a first set of the segments 20a and a second set of the segments 20b. Individual segments of one set are each disposed between a pair of segments of the other set in regular circumferential sequence. Except as presently to be noted, the segments 20 are identical; all are supported by a center structure 35. The center structure 35 is an assembly which includes a circular plate 36 secured coaxially on a cylindrical shell 37 fitted coaxially and corotatably on the sleeve 12. A bag support ring 38 is mounted on the plate 36 by the cap screws 39 and supports, coaxially of the drum axis, an annular inflatable bag 40 which, on being inflated expands all of the segments 20 radially outward. To the respective axial faces of the ring 38 are attached a pair of radial guides 42 for each of the segments 20, spaced angularly about the drum axis. The respective guides 42 extend radially outward beyond the outer surface of the ring 38 sufficiently to form with the ring 38 a channel which prevents axial displacement of the bag 40 with respect to the axial midplane 45 of the drum.

The axially outward and radially extending portion of each guide 42 is provided with a slide way 46. Pressured air is admitted to and released from the bay by way of a conventional air piping arrangement 47.

The individual segments 20 each comprises an outer axially extending member 21 formed with a central rectangular slot 22. The radially outward surfaces 23 of each segment incline radially and axially outward from the slot to a smoothly rounded high portion 24 whence the surfaces turn radially inward to their respective axial ends 25. The surfaces 23 are alike and are disposed symmetrically with respect to the plane 45. Each member 21 is detachably secured to a bar 26 of rectangular cross-section extending parallel to the drum axis immediately outward radially of the bag 40, and terminates beyond the respective guides 42 but short of the axial ends 25. The width of the bars 26 is such that in the collapsed condition of the drum the spaces between the bars are negligibly small. The radially inward surfaces of the bars 26 are engaged by the bag 40 to move the segments 20 radially outward of the drum axis, being guided radially by the legs 27.

A leg 27 is fixed to and extends radially inwardly from each axial end of each bar 26. The legs are formed to slide radially along the respectively associated slidways 46. Each leg is, at its radially inward end 28, turned to resemble a letter J axially outwardly about a semi-circular arc seat, from which the leg extends radially outward as at 29 to form a stop 30. The stops 30a associated with the segments 20a of one set are located at a greater radial distance inward of the surfaces 23 of the respectively associated segments 20a; and the stops 30b associated with the segments 20b of the other set are located a lesser radial distance inward of the respective surfaces. The radial difference between the greater and lesser radial distances is predetermined by the radially outward extent of the leg part at 29. A garter spring 32 encircling and bearing on the arc seats biases the segments radially inward toward the shaft 14.

Two rigid side drums 50 extend outwardly, coaxially of the shaft 14, from the respective ends 25 of the segments 20. The surfaces 23 of the segment members 21 between the high portions 24 and the ends 25 incline inwardly to bridge the gap (which would otherwise exist in an expanded condition of the drum) between the segments and the respective side drums, and prevent intrusion of an elastic sleeve, presently more fully described, overlying the segments 20 and the side drums 50.

Each side drum 50 is an assembly comprising a circular plate 51, buttresses 52, a cylindrical shell 53 and a mounting ring 55. The plate 51 has a central circular opening in which the shell 53 is fixed concentrically and perpendicularly to the plate. The buttresses 52 are spaced angularly about the shell 53 and extend radially along the axially outward surface of the plate 51 and each is attached rigidly, as by welding, both to the plate 51 and to the shell 53. The side drums 50 are mounted coxially and corotatably on the shaft 14 by the respective shells 53, one abutting each end of the previously described shell 37. A nut and lock ring at 54 secure the three shells 43, 34, 53 together and against the hub 13.

A mounting ring 55 is secured concentrically on each plate 51, and extends radially outward of its periphery. The assembly of each side drum 50 further includes the rigid rings 56, 57, a plurality of bolts 58, and axially extending rigid cylindrical drum 60 having a radially inward flange 62 and a further mounting ring 64, carried by the ring 55.

Each ring 55 has a passage 77, for the flow of inflating air to and from the inflatable portion of the below-described expandable sleeve, formed by a radially extending hole open to the radially outward surface of the ring 55 and which hole connects to an axially extending hole opening in the axially outwardly surface of the ring 55. The latter hole is suitably threaded to accept a fitting (not shown) which is connected to a similar fitting in the threaded opening of one of the passages 17, by air flowing tubing (not shown).

Each ring 55 has an axially inward face and an axially outward face, each having a locating step. The ring 56 abuts the inward face, being located coaxially of the ring 55 by the step. The ring 57 abuts the outward face and is in a like manner located coaxially of the ring 55 by the step. The rings 56, 57 and the ring 55 are clampled together by the bolts 58.

The flange 62 of each axially extending rigid cylindrical drum 60 abuts and is located coaxially of the respective ring 64 by a step formed in the axially outward face of the ring 64. The ring 64 abuts the axially outward face of the ring 57 and is located coaxially axially thereof in the same manner. Each drum 60 is fixed rigidly in the respective assembly by the bolts 66 through the flange 62, the ring 64, and threaded into the ring 57. Each ring 64 also has a passage for flow of inflating air to and from a bladder, presently to be described, provided by a hole extending radially through the ring 64. The radially inner end of the hole is threaded to accept a suitable fitting which is connected for air flow to another of the passages represented at 17 as has been described above.

The outer surface 70 of the drum is provided by an expansible sleeve 72 extending circumferentially and axially outward from the mid-plane 45 toward the distal end of the respective side drum 50. Each sleeve includes a portion 74, adjacent the drum mid-plane, which portion is formed of rubbery elastic material without cord reinforcement and is, by an integral flange 75, retained in the slots 22.

The inflatable portion 76, when uninflated, extends circumferentially around and axially along the drum from a circumferential fold line at 76a, where it is joined integrally with the non-reinforced portion 74, to an axially outward fold line 76d near the distal end of the respective side drum 50. The portion 76 has an outer wall extending between the respective fold lines 76a and 76d. From the fold line 76a a first inner wall 76e extends axially to an annular edge 76b disposed between the rings 55 and 56 and there obtained by an annular groove in the latter. A second inner wall 76f extends from the outer fold line 76d axially inward to an annular edge 76c disposed between the rings 55 and 57 and there held in an annular groove in the ring 57. The portion 76 is cord-reinforced by a pair of cord plies, the cords of which are disposed equally and oppositely at angles of about 80° with respect to a plane normal to the axis of the drum. The portions 76 are thus readily expandable radially and are axially nearly inextensible.

The axial length of the two sleeves 72 together is at least approximately equal to the periphery of a cross-section of the core 80.

The surface 70, when the segments are collapsed and the portions 76 uninflated, is generally a right circular cylinder. When the segments are expanded and the sleeve portions 76 are inflated, the portions 74 tend to be strained axially outwardly from the slots 22.

To inflate the portions 76, compressed air at about 1–5 psi (70–350 g/cm$^2$) from a suitable source enters the inflatable portion 76 of each sleeve 72 by way of passages 77 in the respective rings 55. The pressure of the inflating air is preferably low due to the inherent low strength of the core. The pressure stated here is sufficient to wrap the sleeve 72 partially about the core 80 as indicated by the position thereof illustrated at A in FIG. 1. In the present embodiment the core 80 has an inside diameter of 26.3 inches (about 67 cm.), an outside diameter of 38.7 inches (about 98 cm.), and axial width of 12¾ inches (about 32½ cm.) and is suitable for a 12.5–22 tire.

Means for urging the inflated portions 76 axially to cause the sleeve to envelop the core 80 are provided on each side drum 50 by an inflatable annular bladder 85, the edges 85a, 85b of which are disposed respectively between the rings 64 and 57, being there held in an annular groove in the latter, and between the ring 64 and the flange 62 secured there in a like annular groove in the flange 62. The bladder 85, uninflated, extends coaxially of the drum 60 outward from the ring 64 to the distal end of the side drum 50, lying between the drum 60 and the sleeve 72. Cord reinforcement in the bladder 85 is placed in the manner described for the sleeve portions 76.

A particular feature of the invention is the provision for a plurality of controlled working diameters of the drum 10 enabling, for example, accommodation of changes in inner diameter of a core as building elements of a tire in process are successively wrapped about the core. A notable aspect of the drum according to the invention is that all of the segments 20 cooperate to support the core or tire and core at each working diameter.

To provide a plurality of controlled, and different, working diameters, the drum provides diameter stop means comprising the previously described segment stops 30, and further including a pair of lug plates 90 disposed to rotate coaxially of the drum axis adjacent the respective axially inward faces of the side plates 51. Each lug plate 90 has a circular array of angularly spaced apart stop lugs 92 disposed at equal radial distances from the drum axis 93 and is supported for rotation relatively of the side plates and of the segments 20 by the roller studs 96 located at angular intervals concentrically of the axis 93 on each plate 51. The roll surfaces of the stud 96 engage a cylindrical guide surface 94 on the radially inner annulus of the plate. The arrangement provides for maintaining the surfaces of the stop lugs 92, which engage the respectively abutting surfaces of the stops 30, at equal distances from the axis 93 in each operative position of the lugs 92.

The two plates 90 are connected to each other for rotation as a unit by three rungs 98 each of which extends through a clearance hole 99 formed in the plate 36. By the rungs, the plates 90 are spaced apart axially to dispose each array of lugs 92 in a plane, normal to the drum axis, in which plane the respectively associated stops 30 on the segments are also located. Each plate 90 has one lug 92 for each two segments 20 in the drum, the lugs being spaced apart equally about the axis 93 by interlug spaces slightly wider than the lugs and than the stops 30. By rotating the lug plates 51 the stop lugs 92 can be selectively positioned to engage either the diameter stops 30a associated with the segments 20a of one set or the stops 30b of the segments 20b of the other set. To rotate the lug plates, an air cylinder 110 is mounted by the trunnion 112 on the center structure 35 such that its piston rod can move parallel to the plate 36 to rotate the plates 90. The piston rod 114 is connected by a clevis 116 to one of the rungs 98 so that extension of the rod rotates the plate 90, thereby locating the lugs 92 in radial alignment with the stops 30b; retraction of the rod 114 rotates the plate 90 to dispose the lugs 92 in radial alignment with the stops 30a. Controlled air pressures to the cylinder 110 are supplied from outside the drum by way of passages 18 in the center shaft 14 and air tubing (not shown) extending through access opening 118 in the plate 90 and one of the holes 99 in the plate 51.

As has been noted, all of the segments 20 cooperate to support a core at each selected working diameter provided by the stop means.

Because the bag 40 engages all of the bars 26 of the segments equally, inflation of the bag tends to move all the segments radially outwardly simultaneously and equally. The radially outward movement of one set of segments is positively limited by the stop means, that is, by the engagement of the stops 30 of the selected set with the lugs 92. It has been found that the other set of segments is moved radially outward at the same time only a slight amount, if at all, beyond the segments of the selected set. This effect appears to be due to the physical properties of the wall of the bag 40. This effect will be greater as the total number of segments is increased, thereby reducing the arc span of bag between the positively stopped segments. The drum has 54 segments.

A characteristic feature of the invention is use of the core 80, which is disintegratable, to be removed from the tire after the tire has been built thereon. Such cores are known and are formed of known materials enabling them to be dissolved by suitable solvents, or otherwise disintegrated to a sufficiently fluent state, to be flushed out by way of the inflation valve port of the tire. The method and the apparatus according to the invention provide improved facility for safe handling of such cores without damage and for greatly facilitated application of sheet material therearound.

In operation, after a sheet of tire building material has been wrapped about the drum in its collapsed state to form an endless cylindrical sheet therearound, the core is carried coaxially of the drum and positioned therearound symmetrically with respect to the mid-plane 45 of the drum by a roller cradle 120.

The bag 40 is inflated to expand the drum to the selected larger working diameter determined by engagement of the stops 30a of the segments 20a and the lugs 92. The segments 20 press the middle portion of the sheet to the core 80 with only sufficient force adequately to support the core 80 without bursting it or damaging the sheet. With the core stably supported by the conforming surfaces 23 of the segments, the cradle 120 is removed. At this stage the axially inner ends of the inflatable portions 76 at the fold lines 76a, and the sheet, are nipped between the core and the segments. Then the inflatable portions 76 of the sleeve are inflated by compressed air at a pressure of from 1 to 5 psi which acts to wrap the sheet progressively outwardly along the toroidal surface of the core. The pressure used to inflate the portions 76 is limited by the strength of the core 80, but is enough to expand the sleeve 72 as indicated at A in FIG. 1, outwardly toward the mean diameter of the core sufficiently to permit the bladder 85 effectively to roll the sleeve 72 and the sheet about the core without further inflating the portions 76. Each bladder 85 is then inflated to a sufficient pressure, about 10 to 15 psi (about 0.7 to 1 kg/cm$^2$), to roll the inflatable portions 76 toward the core which rolling acts to transfer the sheet completely on to the periphery of the core. The pressures cited have been found suitable for the tire and core specified herein. For tires and cores of other sizes, suitable pressures can be readily determined by experiment. The actual inflation pressure required is also influenced by the properties of the sleeve 72, particularly the inflatable portions 76, and of the bladders 85. Both the sleeves 72 and the bladders 85 for the drum 10 are made of materials and by techniques commonly used for tire building apparatus heretofore.

In the presently preferred mode of operation, the length of the sheet is such that the axial ends thereof when disposed about the core overlap one another in the region of the mid-plate 45. To effect this overlap, one of the two bladders 85 is delayed in its action relative to the action of the other by manipulating air valves. This permits one edge portion at a time to be disposed on the core 80 beyond the mid-plane 45. Surprisingly, the edge portion of the sheet flips or snaps over from the sleeve 72 onto the core 80. This occurs after the sleeve has been moved toward the core 80 by the bladder 85 sufficiently to have enveloped a major part of the periphery of the respective side of the core, beyond the mean diameter thereof, but before the sleeve envelops the core to the edge of the sheet being applied. Then the one sleeve 72 and its associated bladder 85, having acted to place the first side of the sheet about the core, are deflated and the other bladder 85 is inflated to roll the other sleeve 72 toward the core so as to dispose the opposite edge portion of the sheet on the core and beyond the mid-plane 45 in the same manner, overlapping the first edge portion, after which the latter bladder 85 and its associated sleeve 72 are also deflated. The segments 20 are then collapsed to the minimum diameter by deflating the bag 80. The core 80 is removed to further processing, as for example, winding helically thereabout one or more layers of running length reinforcement wire or cord, after which the core is returned to the drum 10 and positioned thereabout in the same manner as before. The operation previously described is thereupon repeated with the exception that the working diameter now selected is less than the larger working diameter previously described, to accommodate the now smaller inside diameter of the core and partially built tire thereon.

To effect the lesser working diameter, the piston rod 114 is retracted to its other end position, by manipulating a conventional air valve (not shown), thus rotating the lug plates 90 to align the lugs 92 radially with the respective stops 30b of the segments 20b of the second set, which stops are disposed to limit the outward movement of the segments at a diameter sufficiently less than the earlier used larged diameter to accommodate reinforcement cord or wire and/or additional building elements wrapped about the core. The bag 40 is then inflated, moving the segments radially outwardly to press a second sheet to the core enlarged by the additional elements thereon.

As before, the inflatable portions 76 of the sleeves 72 are expanded to wrap the second sheet partially about the core over the material thereon and the bladders 85 are, as before, expanded to complete the wrapping of the second sheet about the core.

The tire produced by the method and the apparatus described herein is a tire intermediate which requires a subsequent additon of tread and other components and remains to be cured prior to its commercial use. The further steps leading to a completed commercial tire form no part of the present invention and, therefore, require not further description here.

It will be appreciated from the foregoing description that the sheet of expandable tire building material which is wrapped about the core, as well as the sheet which is later wrapped about the cord or wire wound toroidally about the core and the first sheet, are both of natural and/or synthetic rubber compounds without cord or wire reinforcement therein. Such material is sometimes called gum stock. The sheet, in each case, is wrapped about the drum and spliced to form a closed cylinder. The expansion of the sleeve 72 and of the portion 76 thereof acts to expand the associated portion of each sheet simultaneously circumferentially as well as progressively along the toroidal surface of the core, beginning at the mid axial plane and radially inward circumference of the core and progressing outwardly to envelop the core.

While certain representative embodiments and details have been shown for the purpose of illustrating the invention, it will be apparent to those skilled in the art that various changes and modifications may be made therein without departing from the spirit or scope of the invention.

What is claimed is:

1. In a method of making a closed torus tire having a carcass formed of cord or wire wound continuously about a toroidal core of disintegrable material and a plurality of layers of elastomeric sheet material disposed to cover said cord or wire, and subsequently be cured, the improvement in said method comprising disposing a sheet of elastomeric tire building material in endless cylindrical form about a cylindrical tire building drum, disposing the core coaxially about the drum in radially spaced relation thereto, expanding the drum to press the axial mid-portion of the sheet to the core, then further expanding the lateral portions of the sheet adjacent to and axially outwardly of the mid-portion progressively about the core by expanding an inflatable member, and urging the respective lateral portions toward the core thereby causing said lateral portions to wrap further about the core and the respective axial edge portions of the sheet to flip over from said member to the core and subsequently disintegrating and removing the core from the tire.

2. The method as claimed in claim 1, including causing the axial edge portions of the sheet to flip sequentially over the core beyond the axial mid-plane thereof to form a circumferentially extending overlap of one edge portion with respect to the other edge portion.

3. An apparatus for building a closed torus tire comprising a toroidal core of disintegratable solid material, an expandable building drum, a pair of expandable sleeves disposed circumferentially about the drum and extending respectively axially outwardly from the midplane of said drum, each said sleeve including an inflatable portion, means for urging each said portion axially toward said mid-plane while said portion is inflated to wrap said sleeve about the core, and means for providing said drum with a plurality of predetermined different building diameters including two sets of segments, each segment of one set being disposed between two segments of the other set, said segments being disposed circumferentially of the drum, and stop means selectively operable to limit the radially outward movement of the segments of one set at one building diameter and to limit the radially outward movement of the segments of the other set at a different building diameter.

4. A tire building drum as claimed in claim 3, wherein said stop means comprises radial stops fixed on each segment, said stops on one set of segments being spaced radially of the drum from said stops on the other set of segments by a predetermined distance in the collapsed condition of the drum, and a plurality of stop lugs mounted for movement angularly about the drum axis at a fixed radial distance from said axis and selectively engageable with the radial stops of one set of segments in a first position of the lugs and with the radial stops of the other set of segments in a second position of said lugs.

5. A tire building drum as claimed in claim 3, wherein said stop means comprises a circular stop plate mounted for rotation about the axis of the drum, an angularly spaced circular array of stop lugs fixed on said stop plate, a radial stop fixed on each said segment, each said stop on one set of said segments being spaced radially of the drum with respect to the stops fixed on the other set of said segments by a predetermined radial distance when the drum is not expanded, and means for rotating said stop plate relatively of said segments to position said stop lugs selectively to engage the radial stops on said one set or on said other set of segments.

6. A tire building drum as claimed in claim 3, further comprising a pair of side drums fixed coaxially of and extending axially outwardly respectively from the opposite ends of said segments, said expandable sleeve being secured to and near the axially inner end of the respectively associated side drum, and extending when uninflated axially outwardly therealong, and an inflatable bladder disposed radially between said inflatable portion and said side drum being secured at one end to the respective side drum axially outward of the inner end of the respective side drum and extending axially along said side drum axially outward beyond the axially outward end of said sleeve.

7. A tire building drum as claimed in claim 6, wherein the radially outward surface of each said segment slopes radially and axially outward with respect to the mid-plane of the drum.

8. A generally cylindrical tire building drum having a plurality of predetermined effective building diameters, comprising a plurality of segments circularly arranged coaxially of the drum and including two sets of segments with the individual segments of one set being interposed between circumferentially successive segments of the other set, means including an annular inflatable bag disposed coaxially of the drum and radially inwardly of the plurality of segments for urging all of the segments radially outwardly of the drum, and stop means selectively operable to limit the radially outward movement of one set of segments to a first predetermined diameter of said building drum or to limit radially outward movement of the other set of segments to a diameter defining a second predetermined diameter of said drum.

9. A tire building drum as claimed in claim 8, wherein said stop means comprises radial stops fixed for movement with each segment, said stops associated with one set of segments being spaced radially of the drum from said stops associated with the other set of segments by a predetermined distance, and a plurality of stop lugs movable angularly about the drum axis at a fixed radial distance from the axis and selectively engageable with the radial stops of said one set of segments in a first position and with the radial stops of the other set of segments in a second position of said lugs.

10. A tire building drum as claimed in claim 8, wherein the radially outward surface of each said segment slopes radially and axially outward with respect to the mid-plane of the drum.

11. A tire building drum as claimed in claim 8, further comprising a pair of side drums fixed coaxially of and extending axially outwardly respectively of said plurality of segments, an expandable sleeve having an inflatable portion disposed about each side drum, said inflatable portion of said expandable sleeve being secured to the respectively associated side drum and extending, when uninflated, axially outwardly therealong, and a second radially inward inflatable bladder disposed radially between said inflatable portion and said side drum and extending axially therealong beyond the axial end of said inflatable portion.

12. A tire building drum as claimed in claim 8, further comprising a radially expandable cylindrical sleeve including an inflatable portion having two plies of reinforcement cords therein which cords extend equally and oppositely at angles greater than 80° with respect to a plane normal to the axis of the drum, the sleeve extending axially outwardly from the mid-plane of the drum to a parallel plane spaced axially inward of the distal end of the drum, the axial length of the sleeve being sufficient to engage, when inflated, the periphery of an axial cross-section of said core from its inner diameter at the mid-plane to a circumferential line outward of the mean diameter of said core.

13. A tire building drum as claimed in claim 11, wherein each of said segments has a slot adjacent the mid-plane of the drum, said slots cooperating to form a groove extending circumferentially of the drum axis.

14. In a method of making a closed torus tire having a carcass formed of cord or wire wound continuously about a toroidal core of disintegrable material and a plurality of layers of elastomeric sheet material disposed to cover said cord or wire and subsequently be cured, the improvement in said method comprising disposing a sheet of said elastomeric tire building material in endless cylindrical form about a cylindrical tire building drum, disposing the core coaxially about the drum, expanding the drum to press the axial mid-portion of the sheet to the core, then further expanding the lateral portions of the sheet adjacent to and axially outwardly of the mid-portion by inflation of a portion of an elastically expandable sleeve to a pressure less than sufficient to damage the core and sufficient to expand the membrane and the sheet progressively outwardly along the core and further expanding said portion without further inflation thereof by inflating an expandable bladder in circumferential contact with the radially inner surface of said portion of the sleeve to cause the lateral portions of the sheet to further envelop the core.

15. In a method of making a closed torus tire having a carcass formed of cord or wire wound continuously about a toroidal core of disintegrable material and a plurality of layers of elastomeric sheet material disposed to cover said cord or wire, and subsequently be cured, the improvement in said method comprising disposing a sheet of said elastomeric tire building material in endless cylindrical form about a building drum, placing the core coaxially about said building material on the drum, expanding the axial mid-portion of said building material to a first diameter at the radially inner surface of the core, and then expanding the axially outward portions of said building material progressively to successively increasing diameters greater than said first diameter to envelop the core.

16. Apparatus for building a tire comprising an expandable tire building drum having a plurality of predetermined effective building diameters, comprising a plurality of segments circularly arranged coaxially of the drum and extending axially thereof, means including an annular inflatable bag disposed coaxially of the drum and radially inwardly of the plurality of segments for urging all of the segments radially outwardly of the drum, and stop means including a pair of radial stops affixed to each segment operable to limit the radially outward movement of said segments, and means movable angularly about the drum axis and engageable with the respective radial stops to limit the radially outward movement of said segments to a selected one of a plurality of diameters of said drum.

17. Apparatus as claimed in claim 16, and means for rotating said angularly movable means relatively of said segments to select one of said plurality of diameters.

* * * * *